No. 807,058. PATENTED DEC. 12, 1905.
H. BREIDING.
TRACE SPLICE.
APPLICATION FILED JUNE 5, 1905.
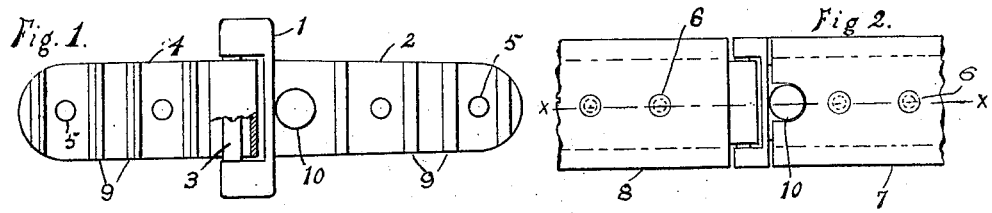
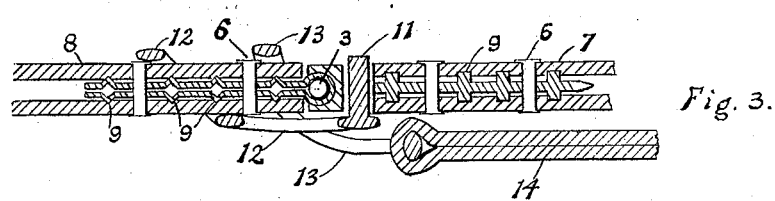
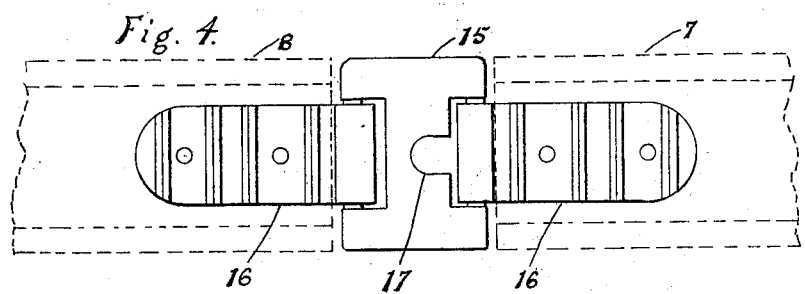
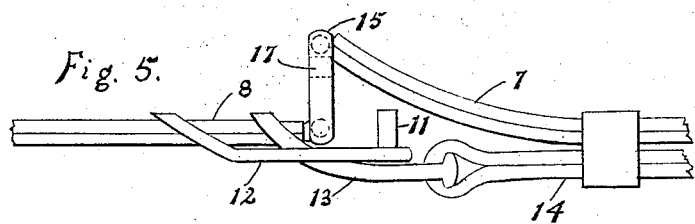
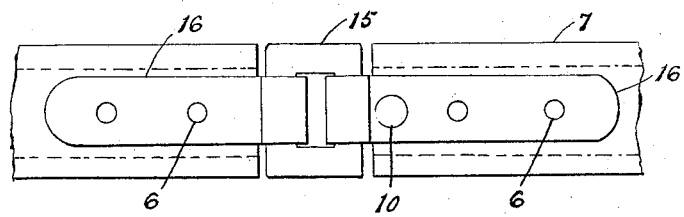
Witnesses
Millard Haskell
I. L. Weaver
Inventor
Henry Breiding,
By Walter N. Haskell,
Attorney

UNITED STATES PATENT OFFICE.

HENRY BREIDING, OF STERLING, ILLINOIS.

TRACE-SPLICE.

No. 807,058.   Specification of Letters Patent.   Patented Dec. 12, 1905.

Application filed June 5, 1905. Serial No. 263,714.

*To all whom it may concern:*

Be it known that I, HENRY BREIDING, a citizen of the United States, residing at Sterling, in the county of Whiteside and State of Illinois, have invented certain new and useful Improvements in Trace-Splices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to trace-splices for harnesses, and is designed to provide a ready means for uniting the adjacent ends of a trace which has been broken. Its chief advantages consist in the cheapness with which it can be produced and the facility with which it can be introduced into the ends of the trace without cutting or interfering with the threads by which the layers of the trace are fastened together.

In the drawings, Figure 1 is a plan view of my invention. Fig. 2 is a similar view showing the same in use. Fig. 3 is a longitudinal section in the line *x x* of Fig. 2. Fig. 4 is a plan view of a modified form of my device. Fig. 5 is an edge view thereof when released from the trace-buckle. Fig. 6 shows still another modified form in plan view.

My invention is of hinge formation and primarily comprises a central bar 1 of substantially the same thickness as the trace and equaling in length the width of the trace. Integral with the bar 1 is a leaf 2, adapted to be inserted between the two layers of leather of which the trace is usually formed. The bar 1 is recessed longitudinally, so as to provide on the side thereof opposite to the leaf 2 a post or pintle 3, upon which is hinged a leaf 4, similar in shape to the leaf 2 and preferably formed of a strip of sheet metal, bent at its central part about the pintle 3, the two parts thus provided coming together and forming the leaf, as shown in Fig. 3. Each of the leaves 2 and 4 is provided with the usual perforations 5 for the insertion of rivets 6, by means of which the parts of the trace ends 7 and 8 are secured to such plates. The width of the leaves 2 and 4 is less than the space between the threads by which the trace is fastened together at its edges, whereby such threads are not cut or injured by the insertion of the leaves, and the adjacent ends of the trace are permitted to abut the edges of the bar 1.

9 9 represent transverse ribs with which the leaves 2 and 4 are provided on each of their faces. Upon the clamping together of the parts of the trace and the leaves by the rivets 6 the ribs become embedded in the inner faces of the leather strips, tending to hold the leaves more immovably in place and reducing the strain and wear upon the rivets. The use of such ribs is optional, however, and they are not essential to the successful operation of the device. The ribs are preferably arranged transversely of the leaves, but may extend longitudinally or diagonally thereof, if desired.

The plate 2 is also provided with an opening 10, adjoining the bar 1, in which is inserted the pin 11 of the usual buckle 12.

13 is the free loop of the buckle, to the forward end of which is attached the hame-tug 14, to which the front end or billet 7 of the trace is normally secured by means of ordinary harness-loops. (Not shown.)

In removing the trace from the buckle the billet 7 is first disengaged from the hame-tug 14 and turned outwardly at right angles to the trace 8. By reason of the hole 10 being forward of the pivotal point of the device the movement of the trace 7 outwardly operates to release the same from the pin 11, whereupon the trace can be readily adjusted.

In Fig. 4 is shown a modification wherein the bar 1 is replaced with a plate 15, at each end of which is hinged a leaf 16, each of which is formed of a folded strip similarly to the leaf 4. The plate 15 has a perforation 17 for the engagement of the pin 11 of the buckle. The leaves 16 are provided with rivet-holes and are secured in the trace ends similarly to the leaves 2 and 4. They may also be provided with the ribs 9, if desired. In adjusting the trace the plate 15 is turned outwardly at an angle to the trace 8, as shown in Fig. 5, such movement disengaging the plate and pin 11 and permitting the adjustment of the trace without removing the billet 7 from the loops on the hame-tug 14.

Fig. 6 illustrates a form of the device wherein the central bar of the plate 15 is omitted, the leaves 16 being pivotally attached at the sides thereof. In this view the leaves 16, which are formed of metal strips, similarly to the leaf 4, are shown embracing the ends of the trace instead of being inserted therein, one of the plates of which the leaf is formed being on one side of the trace and the other plate on the opposite side. Any of the leaves which are hereinbefore referred to which are formed of a metal strip folded together can be similarly attached on the outside of the trace, if desired, the result being the same as if they were inserted in the trace.

It will be seen that the leaf 4 and similar leaves may be easily cut or stamped from sheet metal of suitable thickness ready to be placed in position, thus lessening the cost of production thereof.

As there is some side movement on the pivotal point of the device caused by the "working" of the trace, it is advisable to have those points upon which the draft is exerted as central as possible, and this is attained in my invention, the hinge portion being considerably less in width than the trace, the bar 1 and plate 15 being merely extended outwardly to fill the gap between the adjacent ends of the trace.

Some devices now in use cannot be placed in position without cutting a few of the stitches at the end of the trace and interfering with the replacing thereof, resulting in time in the further ripping of the seams and loosening of the parts of the trace. As before mentioned, my invention is specially designed to avoid any difficulty of this nature, there being no possible interference with the stitching of the trace when such device is used.

What I claim as my invention, and desire to secure by Letters Patent of the United States, is—

1. In combination with the ends of the trace, of a trace-splice comprising a central plate, and a pair of leaves pivotally attached to said plate at opposite sides thereof, said plate being provided with an aperture, and a buckle arranged on one of the ends of the trace and being provided with a pin, said pin being normally received in said aperture.

2. In a device of the character described, the combination with the ends of the trace, of a pair of leaves each secured in one of the ends of the trace, a plate pivotally connected on its opposite sides with the leaves and being provided with an aperture, and a buckle arranged on one of the ends of the trace and being provided with a pin, said plate being capable of movement whereby said pin may be engaged or disengaged from said aperture.

3. In a device of the character described, the combination with the ends of the trace, of means connecting said ends, and a buckle provided with a pin and arranged on one of the trace ends, said means being capable of a swinging movement for engagement or disengagement with said pin.

4. In a device of the character described, in combination with the trace ends, of ribbed leaves, each secured between the folds of one of the trace ends, a plate provided on each of its opposite sides with a bar said leaves secured on opposite sides of the said plate by means of said bars, said plate being provided with an aperture intermediate said bars, and a buckle having a pin arranged on one of the trace ends, said plate being capable of a swinging movement whereby said pin may be engaged or disengaged from said aperture.

In testimony whereof I affix my signature in presence of two witnesses.

HENRY BREIDING.

Witnesses:
R. W. E. MITCHELL,
Q. L. WEAVER.